Jan. 5, 1965   R. W. ASTHEIMER   3,164,721
NON-SCANNING EDGE DETECTOR
Filed April 23, 1962                                   2 Sheets-Sheet 1

INVENTOR.
ROBERT W. ASTHEIMER
BY
ATTORNEY

Jan. 5, 1965    R. W. ASTHEIMER    3,164,721
NON-SCANNING EDGE DETECTOR
Filed April 23, 1962    2 Sheets-Sheet 2

INVENTOR.
ROBERT W. ASTHEIMER
BY
ATTORNEY

United States Patent Office 3,164,721
Patented Jan. 5, 1965

3,164,721
NON-SCANNING EDGE DETECTOR
Robert W. Astheimer, Westport, Conn., assignor to Barnes Engineering Company, Stamford, Conn., a corporation of Delaware
Filed Apr. 23, 1962, Ser. No. 189,477
6 Claims. (Cl. 250—83.3)

This invention relates to a method of sensing an edge without scanning and of instrumentation for carrying out this result.

The location of an edge marking a sharp radiation discontinuity constitutes an important problem. Perhaps the most striking single manifestation is in horizon sensing and the present invention will be described primarily in connection with horizon sensors although the invention is not limited to this field in its broadest aspects and permits effective location or sensing of any line of sharp radiation discontinuity. As will be pointed out in more detailed description below most horizon sensing utilizes radiations in the infrared, preferably in the long wave infrared. The instances where visible light is used are much rarer but there have been instances proposed where horizon sensing in the ultraviolet has some attractive potentialities, particularly for sensing the horizon of a body such as the moon or even Mars the Lyman alpha radiations at the horizon boundary may be used. In such a case, of course, the disc of the body represents lower degrees of radiation or none at all instead of relatively higher degrees as in the case of infrared where the radiations from a body meet the almost zero radiation of space at the horizon.

Most practical horizon sensors today for use on non-spinning vehicles utilize conical scanning. Generally there are two sensors, one for pitch and the other for roll of the vehicle. Among the earliest and still most successful horizon sensors are conical scanning horizon sensors operating in the infrared. Typical instruments are described in the patent to Merlen No. 3,020,407, Feb. 6, 1962. The conical scan type of horizon sensor which has been used on rockets, Mercury capsules and other vehicles operates effectively but does present certain problems. For one thing there is a continuously rotating element such as a germanium prism and this presents the problems of power and, for unattended vehicles where extremely long life is important, the problem of lubrication in the vacuum of space. Also the prisms and other moving parts increase the possibility of instrument failure. Due to the long scan through space interference from sun and moon is also a problem and while this has been solved to the point where the conical scan horizon sensors operate reliably for long periods of time there is always room for improvement.

According to the present invention pairs of differential radiation detectors are used, displaced with respect to each other. The differential radiation detectors may be of various forms, for example they may be thermal or photoconductive detectors such as two thermistors in series with a bias supply, a differential output being taken from the junction of the two elements. Photoconductors arranged in the same configuration are also useful as differential detectors where the nature of the radiations in the vicinity of the line of radiation discontinuity are of suitable wavelength for such detectors. The preferred detectors for use in the present invention are solid backed thermocouples which are described in a copending application of Hall and Astheimer, Serial No. 270,506, filed Apr. 2, 1963. In this application the active junction is formed on a layer of low thermal conductivity which in turn is on a heat sink of high thermal conductivity.

The present invention depends on a particular position of pairs of differential radiation detectors. Each member of the pair is displaced from the other by the width of one detector element and the detectors in each pair are connected in opposition. Both detector elements are active, that is they can be exposed to radiation as a line of radiation discontinuity moves across the detector pair in a direction parallel to the displacement of the pairs and with the line at right angles thereto. In the case of the modified thermocouple constructions which are preferred this is an unusual design of thermocouple junctions. Ordinarily thermocouples are provided with one active junction, usually referred to as the hot junction, and one reference junction which is often referred to as a cold junction although, of course, temperatures may be reversed where the active junction receives radiation from a source that is much colder than for the reference junction.

While the present invention operates in the same manner, whether biased detectors are used such as thermistors or photoconductors or thermocouples are used, the former use requires that the detector elements be perfectly balanced. For certain instruments such a construction is suitable because, of course, the detector elements can be initially balanced either electrically or optically. However, thermistors change their responsivity with changes in ambient temperature. This effect is also noted with photoconductors but to a much less extreme degree than with thermistors. While it is possible to balance any two thermistors it is difficult to retain this balance if the ambient temperature changes. Therefore, when simple thermistors or even photoconductors are used the instrument may be somewhat limited in its use to ambient temperatures which do not depart too greatly from the temperature at which it was balanced. This limitation on an ordinary pair of differential thermistor or photoconductor detectors is not encountered with thermocouples which is one of the reasons that this modification is preferred although simple thermistor instruments are included within the broad scope of the present invention. There is also included an improved thermistor bridge which does not give spurious signals with changes in temperatures. It is somewhat more complicated than the simple arrangement of detectors and so is somewhat more expensive than the preferred modification using thermocouples. It is, however, included as for some purposes the other type of detectors present advantages. Essentially this modification interposes a chopper between two pairs of thermistors or photoconductors so that they alternately see the desired radiation and view the chopper. The output of the differential detectors is then amplified in an A.C. amplifier which is, of course, not sensitive to changes in the D.C. level as the bridged detector pairs become unbalanced through changes in ambient temperature. The same A.C. signal is obtained regardless of what the D.C. level may be when the differential detectors are exposed to uniform radiation at different levels.

All of the modifications of the present invention possess the important advantage that they have either no moving parts or a much simpler and lighter moving part in connection with the chopped thermistor or photoconductor modifications. This eliminates or greatly reduces the problem of wear and lubrication, power and the like. In addition the preferred thermocouple modification possesses the further advantage that no bias voltage is required which effects an additional saving in power and weight. Ordinarily different designs represent a compromise and improved results are often only obtained at the cost of certain drawbacks such as higher instrument cost and the like. In the present case we have the quite unusual situation that the preferred thermocouple is far cheaper than thermistor or photoconductor detectors. Thus all the advantages are obtained without any disadvantages and in fact with the further advantage of lower price.

When using thermocouples it would be theoretically possible to use other designs of thermocouples such as vacuum thermocouples. However, the constructional difficulties and greatly increased cost together with greater fragility and lower reliability of vacuum thermocouples make the solid backed thermocouples of the Astheimer and Hall application preferable. When the preferred modification of the present invention using thermocouples is employed it is usually desirable to connect a number of opposed thermocouples in series to produce a construction of the thermopile type. Greater sensitivity becomes possible and because of the fact that a large number of thermocouple junctions can be produced almost as cheaply as a pair by vacuum deposition processes the cost of the thermopile is but little more than a single pair of thermocouples and so it will ordinarily be preferred.

The optics to be used in the present invention are, in general, straightforward and so with the exception of one particular modification which is made possible by the present invention they will not be shown in detail. The only requirement is that the optics must permit the line of radiation discontinuity to move across the differential detectors in the direction of displacement with the discontinuity line at right angles thereto. Thus, in the more specific description of the present invention there will only be shown the image of the line of radiation discontinuity and the direction in which it moves. The optics may be of any known type, catoptric, dioptric or catadioptric although in the particular system where the optics are shown the construction lends itself best to a catoptric design.

The present invention will be described in greater detail in conjunction with the drawings in which.

Figure 1:
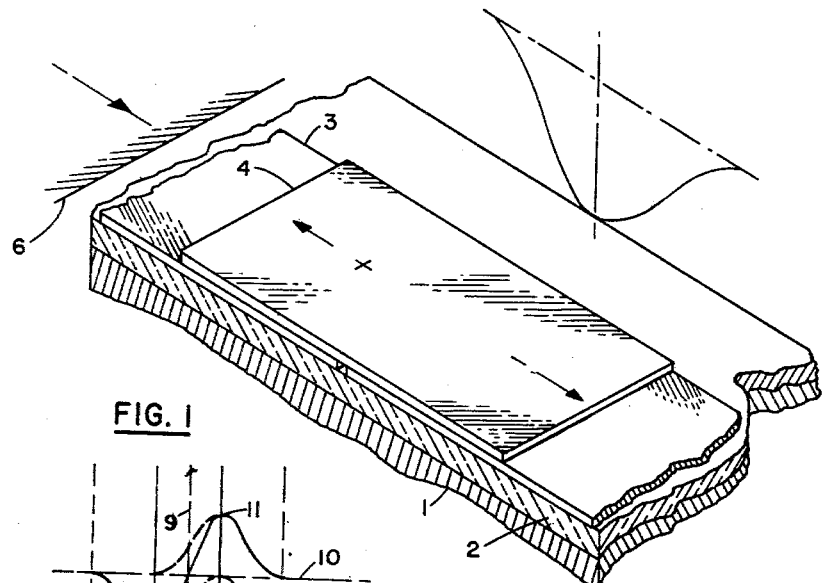
FIG. 1 is an isometric view of a cross-section through a single thermocouple.

In the modification shown in FIG. 1 there is a heat sink 1 which may be of any material of high heat conductivity, for example a block of copper or aluminum or fused aluminum oxide. On the heat sink there is mounted a thin layer of material of low thermal conductivity and preferably of uniform thickness. The layer may actually be mounted above the surface of the heat sink and in such a case films of polyethylene terephthalate commonly sold under the tradename "Mylar" are suitable. The layer may also be formed in a shallow groove in the heat sink in which case it is ordinarily preferable to fill it with a resin, for example an epoxy resin, which is then cured in place.

On the thermal insulating layer there are deposited thin layers of bismuth 3 separated by a small gap and on top there is a continuous rectangular layer of antimony 4. This constitutes two junctions. Antimony and bismuth are a very practical pair of thermoelectric metals to use and the specific description in connection with the drawings will refer to these metals. The invention, of course, is in no sense limited to the particular thermoelectric elements used and for some purposes where maximum thermoelectric power is needed rather than the best compromise between maximum power and signal to noise ratio of the juntions other elements may be employed, for example germanium and silicon. These elements give maximum thermoelectric power but the resulting thermocouples or thermopiles do not have as good a noise equivalent power as do junctions of antimony and bismuth and the latter are therefore preferred where instruments of maximum sensitivity are involved which are detector noise limited. In general the invention is not concerned with a particular choice of thermoelectric elements which will be determined by the nature of the instruments in which the invention is used.

Figure 2:
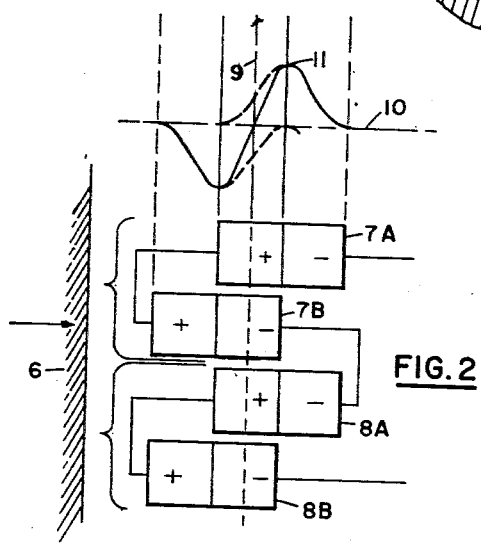
FIG. 2 is a plan view in diagrammatic form of a pair of thermocouple pairs.
Figure 3:
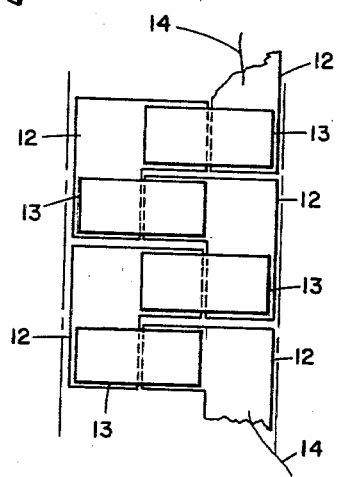
FIG. 3 is a plan view of the actual physical form of the thermocouples of FIG. 3.

If the left hand junction of FIG. 1 were the cold junction in an ordinary thermocouple electricity would flow out of this junction as indicated by the arrow to the left, i.e. from the antimony to the bismuth. In ordinary thermocouple practice this would be considered a positive junction and is indicated by the arrow pointing to the left. If the other junction were the cold junction the flow of current would be the reverse as is shown by the arrow leading to the right. Such a junction would be referred to as a negative junction. While the elements of the present invention are not arranged in the form of pairs of hot and cold junctions but both are active junctions which may be exposed to radiation and the ordinary designation may not be strictly applicable for simplicity the present invention will be phrased in the standard terms as if an active junction were cold. When the junctions are heated the flow of current, of course, is reversed and so heating a positive junction will produce a negative voltage and current and vice versa. In FIGS. 2 and 3 which follow the standard cold junction labeling will be used.

While a single pair of junctions such as is shown in FIG. 1 is not an ideal configuration for the present invention it serves as a simple explanation of the basis on which the present invention operates. If both junctions are at the same temperature there is, of course, no net potential difference between the two pieces of bismuth and no current will flow through any circuits connecting them. However, the situation changes when an edge or line of radiation discontinuity 6 gradually moves across the junctions. This is indicated by the arrow in FIG. 1 and it will be assumed that the shaded side of the line represents a more intense radiation. As the line moves across the positive junction this junction gradually gets hotter than the other junction depending on the proportion of the area of the junction covered by the more intense radiation. This produces a negative potential which is shown in graphic form above FIG. 1. As the line moves across the first junction the negative voltage increases to a maximum which is attained when the whole of the junction receives the stronger radiation. As the line moves further it begins also to heat up the negative junction. The effect of this heating is to produce a positive voltage which reduces the negative voltage of the first junction. This is shown in the graph of voltage when the edge of discontinuity has moved entirely across both junctions the net voltage between them will be zero, assuming, of course, that the area of the junctions and heat capacities are the same. The electrical output will have changed with position of the line of discontinuity but as there is only one polarity of voltage a sharp null is not readily obtained and this simple setup, while illustrating the principles of the present invention is by itself not well adapted for sensitive instruments such as horizon sensors.

The situation is quite different if two pairs of junctions are displaced with respect to each other. This is shown diagrammatically in FIG. 2. The figure shows two pairs of reversed junctions the first pair being designated 7A and B and the second pair 8A and B. As in FIG. 1 the voltage output is shown graphically adjacent to the figure, in this case above it. It will be noted that the two thermocouples of each pair are displaced one junction width. Let us consider the effect of the line of radiation discontinuity 6 moving across the thermocouple. At first it does not strike any junctions. They are therefore all at the same temperature and the net output of the pairs in series is zero. As the line moves forward it first strikes the positive junction of 7B and 8B. This heats up these junctions and produces a negative voltage which reaches a peak when the positive junctions of thermocouples 7B and 8B are fully irradiated. As the edge goes across the negative junctions of 7B and 8B the voltage produced by these junctions begins to decrease as in the graph next to FIG. 1. This is shown in dotted lines. At the same time radiation begins to strike the positive junctions of 7A and 8A. As these are connected in opposition to 7B and 8B the effect is to produce a positive voltage at the final output. This is shown in a dotted line on the graph. The net result is the difference between these voltages which is shown as a continuing solid line in the graph and at a point half way across the positive junctions of 7A and 8A and the negative junctions of 7B and 8B the two voltages cancel each other and a zero point is reached. This mid line across the junctions is shown dashed at 9. The zero point on the graph is indicated at 10. Further travel of the line of discontinuity to the right decreases the negative voltage of couples 7B and 8B and increases the positive voltage of couple 7A and 8A until finally only the negative terminals of 7A and 8A remain cold. At this point the maximum positive voltage is reached at 11 on the graph. It will be seen that there is now a useful null with a polarity of the output signal changing as the line of discontinuity passes to one side or other of the center line 9. We have a signal which is useful for positively locating the discontinuity. At the null the output voltage is zero regardless of how many pairs of reversed thermocouples are connected in series. The reason for connecting a number, for example 20 to 60 of them, is that the change in voltage either side of the null point will be more rapid for a small movement of the line of radiation discontinuity. In other words the sensitiveness of the instrument increases. This is the primary reason for connecting a number of pairs in series. An additional reason is that the voltage output is higher and in instruments and systems which are not detector noise limited a much greater final sensitivity can be achieved. The principles of the invention operate just the same in a single pair as in a number connected together.

FIG. 2 is diagrammatic for the sake of clearness. It represents an undesirably complex mechanical structure. FIG. 3 shows the same circuit of FIG. 2 but in a form which lends itself to mass production. It will be noted that here the antimony layers are in the form of elongated rectangles 13 and are on top. The bismuth elements are in the form of L's 12 and are phantomed where they are covered by the antimony strips. At the end of the pile, of course, there has to be two separate pieces of bismuth. The connecting wires in FIG. 3 are eliminated as the shape of the pieces of bismuth form the electrical connections as well as the junctions. This lends itself to very economical production because the layers of metals can easily be deposited by vacuum depositions in a series of operations with suitable masks. This is a very cheap, rapid and reliable method of manufacture and eliminates all special lead connections except at the two extreme ends of the pile shown by the wires 14 in FIG. 3.

The sequence of the bismuth and antimony layers described above presents advantages in manufacture. Ordinarily the bismuth layers will be somewhat thicker than the antimony layers because of the lower electrical conductivity of the bismuth. When vacuum deposition is used, and this is the preferred method, it is easier to lay down the thicker L shaped layers first, directly onto the insulating layer and then evaporate the thinner antimony bridges across. The particular sequence is, of course, immaterial to the operation of the instrument and instruments can be designed with the antimony layers L shaped and the bismuth layers as rectangular bridges. In such a case, of course, the polarity of the junctions is reversed and, therefore, the polarity of the output voltage is also reversed. For practical manufacture the laying down of thicker L shaped bismuth layers first with antimony bridging layers on the top presents some advantage and is, therefore, preferred though the invention is in no sense limited thereto.

The cross-section in FIG. 1 is shown enormously exaggerated for the sake of clarity. In an actual construction with a time constant of a few milliseconds the antimony layers 13 may be about $1\mu$ thick, the bismuth layers 12 about $3\mu$ thick and the layer of Mylar or other heat insulator about $10\mu$. The present invention is not limited to any particular thicknesses but in general it is desirable to have the insulating layer fairly thick, in relative terms, as the sensitivity of the instrument increases with the thermal impedance represented by this layer. Limits are set by the permissible time constant required in the particular instrument in which the invention is used. There are also practical limits to the thickness of the heat insulator which are set by its heat capacity. In other words the sensitivity of the instrument cannot be increased indefinitely, even if the long time constant could be tolerated, because the insulating layer would finally represent too high a heat capacity. However, the final limitations on insulator thickness do not introduce any critical manufacturing problem for instruments of the present invention. Usually the limitations imposed by a reasonable time constant begin to take effect before the insulating layer reaches excessive thicknesses.

Advantageously the heat conductivity of the bismuth and antimony leads may be made about equal to the conductivity through the Mylar layer. Such a balance is obtained with the approximate connections referred to above.

Figure 4:
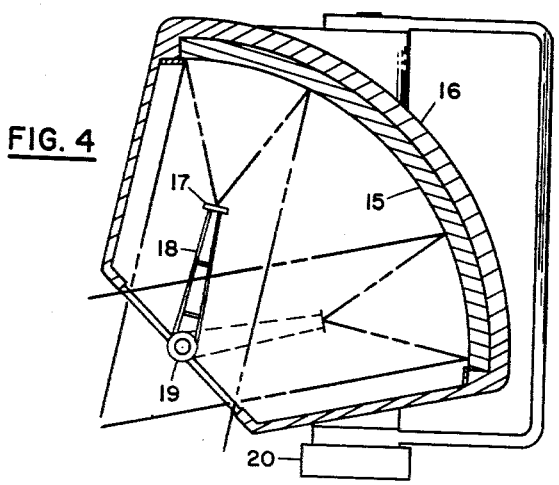
FIG. 4 is a section through a modified horizon sensor.

The problems presented by moving parts have been discussed above when the instrument is to be used in an unfriendly environment. Most of these problems arise, or become seriously acute, only when the movement is rapid. Slow movements do not present a serious problem. Thus, for example, if an instrument is using the present invention for determining the location of a radiation discontinuity which might be a horizon, it might be necessary from time to time to slowly move the detector if the vehicle in which the instrument is located loses the horizon, for example if it changes its altitude significantly. Also very slow scanning can often be effected even with a continuous movement if it is sufficiently slow because in such cases bearings without volatilizable lubricants and the like may be used. For example, in a horizon sensor in which the detector is moved at the rate of 20 r.p.s., serious wear and lubrication problems can arise. On the other hand if the scan was only one or two r.p.s. the problem might not be so serious. The present invention lends itself to instruments which will involve some motion from time to time but do not require a rapid scanning as in the ordinary horizon sensor and detector. Such an instrument is shown in FIG. 4. A mirror 15 is mounted in a framework 16. A detector of reversed pairs of thermocouples according to the preceding figures is shown at 17 mounted on a light framework 18 which is rotatable about a pivot 19 at the center of curvature of the mirror.

Such an instrument may be used for example where the precise location of the horizon is detected without movement but where when the horizon is lost as, for example if a vehicle changes its altitude greatly, a slow rotation about the pivot 19 can take place until the horizon once again is centered as described on line 9 of FIG. 2. Ordinarily it is only necessary to move the detector to compensate for changing altitude. In other words, the motion is in a vertical plane. Sometimes, however, instruments require motion in azimuth and this can be effected in FIG. 4 by an azimuth torquing motor 20.

Figure 5:
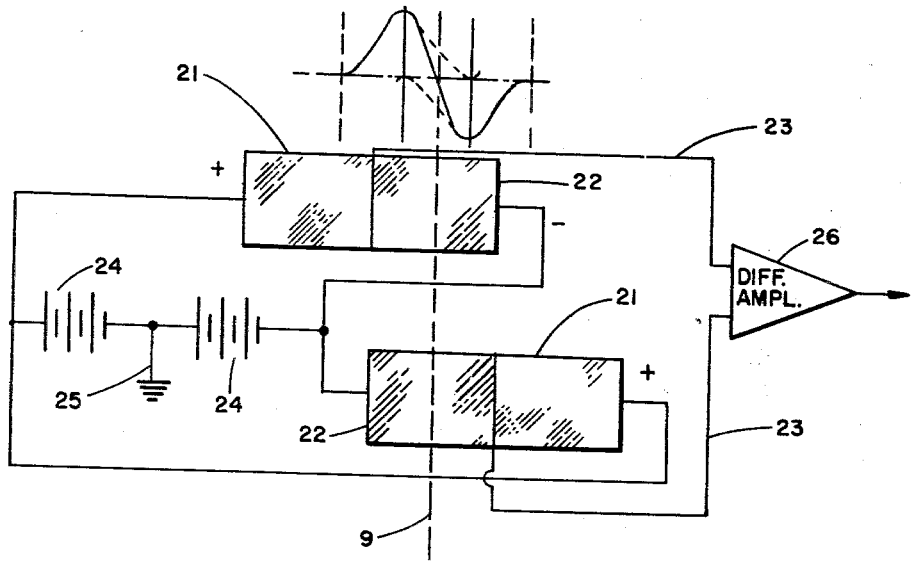
FIG. 5 is a diagrammatic representation of two differential thermistor detectors.

The principles of the present invention have been described in conjunction with displaced thermocouple pairs. This presents many practical advantages and is the preferred form of the invention. However, the principles of the invention are applicable to any detectors which have sufficiently extended surfaces. For example paired thermistors arranged as differential detectors with a central electrode may be employed. This is illustrated in FIG. 5. Differential thermistor detectors with flakes 21 and 22 and the conventional biasing supply are mounted in bridge form, the differential outputs being taken at 23. The bias supply is a battery 24 with a grounded center tap 25. The output from the two leads 23 is led to a differential amplifier 26 where it is amplified to produce an error signal. For clearness the detector flakes have been enormously exaggerated in size. In actual instruments each flake is of the order of a millimeter square or even in some cases slightly smaller. While the figure shows the flakes greatly exaggerated in size it shows their relative positions precisely and it is, of course, just as important that the thermistor detector pairs be displaced by a single detector element width as it is that the displacement in FIGS. 2 and 3 be a single junction width.

The plot of the voltage produced as an edge of radiation discontinuity passes across the detectors is shown adjacent the figure. It will be seen that it is of the same shape as the plot of voltage adjacent FIG. 2 but the polarities are reversed. A sharp null is obtained in the same way.

There are two disadvantages in the use of thermistor pairs as described in FIG. 5. The first is the obvious one that a biasing supply becomes necessary. This first drawback is not very serious in many cases where there is available adequate power. The second drawback, however, seriously limits the field of utility of the instruments.

Thermocouples always give an accurate zero output when both junctions are at the same temperature and for practical purposes variations with ambient temperature changes are so small that they can be disregarded. This is not true of thermistors which change their responsivity very markedly with change in ambient temperature. Theoretically if the thermistor pairs were absolutely perfectly balanced and they changed absolutely uniformly there would be no displacement of the null point. Unfortunately this is an ideal which cannot be achieved in practice and therefore a simple instrument with two pairs of thermistors as shown in FIG. 5 is useful only where the ambient temperature changes are not very great.

Figure 6:
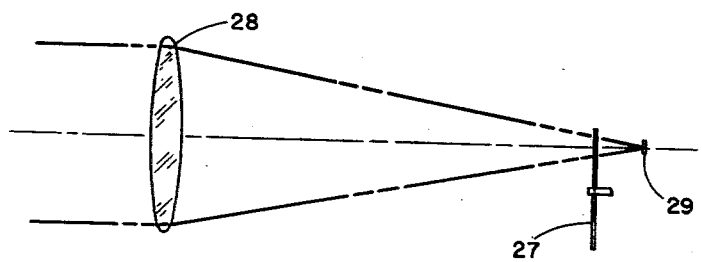
FIG. 6 is a section through simple optics embodying the detectors of FIG. 5.

It is possible to compensate automatically for changes in ambient temperature. Such a device is shown diagrammatically in FIG. 6. Radiation passes through collecting optics, shown as a lens 28. The radiation then passes through a chopper 27 and strikes the four thermistor flakes at 29. The arrangement of the flakes is the same as in FIG. 5 but as FIG. 6 is a section the individual flakes do not appear as separate elements. FIG. 6, however, gives a much more nearly correct relative size scale than does FIG. 5. The chopper 27 is of conventional design with blades which alternately permit radiation to strike all four detector flakes and then cut it off from all four. The design of the chopper forms no part of the present invention and it is, therefore, shown diagrammatically. All that is necessary is that it be of proper dimensions so that the whole of the four detector flakes are illuminated or all four blocked by a detector blade.

The differential output from the detector is passed to an amplifier as in FIG. 5 but now the amplifier is an A.C. amplifier. This cancels out the effect of D.C. drifts due to changes in ambient temperature. The effect can be illustrated by considering a large drift of one volt. Now when the radiation discontinuity crosses the dashed center line 9 shown in FIG. 5 the D.C. output will be plus one volt and this will be the output at null regardless of the degree of radiation on the four dectector flakes. In other words, the chopper will produce an A.C. signal from the detectors which varies with respect to one volt instead of zero volts as in a perfectly balanced bridge. The A.C. amplifier, however, does not respond to D.C. voltage level and so it receives an input signal and produces an output signal which corresponds only to the A.C. input. This, of course, is zero when the line of radiation discontinuity is at the center of the flakes 22. In other words, spurious signals due to changes in ambient temperature are eliminated.

The thermistor detectors especially when associated with a chopper as in FIG. 6 will give the same type of output signal as the thermocouples of FIGS. 1 to 3. They require, however, the added complexity of biasing supply and a differential amplifier. For this reason the modification of the present invention using thermocouples is preferred. It possesses all of the advantages of the thermistor detectors with fewer elements.

It will be noted that the thermocouple junctions and thermistors respond only to the heating effect of the radiation striking them. In other words their response is flat from the ultraviolet out into the long wave infrared. The principles of the present invention may be used with wavelength sensitive detectors such as, for example, barrier layer cells, photoconductors and the like. Such instruments, of course, do not show the advantages of utility over an enormous range of radiation wavelengths. In its broader aspects, therefore, the invention is not limited to the use with any particular wavelength of radiation. However, since it is more difficult to obtain sensitive detectors in the long wave infrared the present invention is particularly useful in instruments which operate with radiations of these wavelengths and some of the uses involving such radiations present especially attractive fields for the present invention.

Essentially the present invention is not concerned with what is done with the signal which it produces when the line of radiation discontinuity departs from the center line position represented by the line 9. It is an advantage, however, that the output lends itself to simple processing. Thus, for example, it may be used in the control of the input winding of a magnetic amplifier. The possibility of using simpler electronic processing circuits is a practical advantage of instruments using the present invention, and therefore, while the present invention is not limited to the use of any particular processing circuits, the fact that simple ones can be used constitutes a practical advantage.

The preferred modification of the present invention has been described specifically in connection with solid backed thermocouple junctions, that is to say those which are mounted on a heat sink with an interposed layer of low thermal conductivity. The advantages of such a construction in rugged compactness and low cost of production makes it the preferred form when thermocouples are used in the present invention. It should be understood, however, that the same effect of a moving line of radiation discontinuity is obtained with other types of thermocouple junction construction for example vacuum packed thermocouples.

I claim:

1. An instrument for determining movement of a line of radiation discontinuity comprising in combination,
   (a) at least one pair of differential radiation detectors of uniform detector element width and reversed outputs the detectors in alternating pairs being displaced with respect to the other by a detector element width,
   (b) the detector elements being in the same plane, and means for imaging a line of radiation discontinuity onto the plane of the detector pairs, the image of the line being at right angles to the direction of displacement of the detector pairs.

2. An instrument according to claim 1 in which the detectors are thermistor detectors.

3. An instrument for determining movement of a line of radiation discontinuity comprising in combination,
   (a) at least one pair of thermocouples with dual active junctions the junctions of each pair being connected in opposition and one thermocouple of alternating pairs being displaced with respect to the other by the width of an element forming part of the junction,
   (b) both junctions of the thermocouple pairs being in the same plane, and means for imaging a line of radiation discontinuity onto the plane of the thermocouple pairs the image of the line being at right angles to the direction of displacement of the thermocouple pairs.

4. An instrument according to claim 3 in which the thermocouple pairs are mounted on a layer of material of thermal conductivity which is in turn mounted on a heat sink block of high thermal conductivity.

5. An instrument according to claim 4 in which a plurality of thermocouple pairs in opposition are connected in series.

6. An instrument according to claim 4 in which the layer of low thermal conductivity is composed of polyethylene terephthalate.

References Cited in the file of this patent
UNITED STATES PATENTS

| | | |
|---|---|---|
| 2,641,712 | Kircher | June 9, 1953 |
| 3,020,407 | Merlen | Feb. 6, 1962 |